US012632733B2

(12) United States Patent
Yao et al.

(10) Patent No.: US 12,632,733 B2
(45) Date of Patent: May 19, 2026

(54) METHODS, SYSTEMS, ARTICLES OF MANUFACTURE AND APPARATUS TO TRAIN A NEURAL NETWORK

(71) Applicant: Intel Corporation, Santa Clara, CA (US)

(72) Inventors: Anbang Yao, Beijing (CN); Dawei Sun, Beijing (CN); Aojun Zhou, Beijing (CN); Hao Zhao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1193 days.

(21) Appl. No.: 16/981,018

(22) PCT Filed: Jul. 23, 2018

(86) PCT No.: PCT/CN2018/096599
§ 371 (c)(1),
(2) Date: Sep. 15, 2020

(87) PCT Pub. No.: WO2020/019102
PCT Pub. Date: Jan. 30, 2020

(65) Prior Publication Data
US 2021/0019628 A1 Jan. 21, 2021

(51) Int. Cl.
 *G06N 3/082* (2023.01)
 *G06N 5/01* (2023.01)
(52) U.S. Cl.
 CPC .............. *G06N 3/082* (2013.01); *G06N 5/01* (2023.01)
(58) Field of Classification Search
 CPC ............. G06N 3/082; G06N 5/01; G06N 3/04
 See application file for complete search history.

(56) References Cited

U.S. PATENT DOCUMENTS 5,867,397 A * 2/1999 Koza ...................... G06N 3/126
                                                      703/2
6,601,052 B1 * 7/2003 Lee ........................ G06F 18/214
                                                      706/14
(Continued)

FOREIGN PATENT DOCUMENTS

CN        104751228       7/2015
CN        104751842       7/2015
(Continued)

OTHER PUBLICATIONS

Y. Lu, A. Kumar, S. Zhai, Y. Cheng, T. Javidi and R. Feris, "Fully-Adaptive Feature Sharing in Multi-Task Networks with Applications in Person Attribute Classification," 2017 IEEE Conf. on Computer Vision and Pattern Recognition (CVPR), Honolulu, HI, USA, 2017, pp. 1131-1140, doi: 10.1109/CVPR.201 (Year: 2017).*

(Continued)

*Primary Examiner* — Jeremy L Stanley
(74) *Attorney, Agent, or Firm* — Hanley, Flight & Zimmerman, LLC

(57) ABSTRACT

Methods, systems, apparatus, and articles of manufacture are disclosed to train a neural network. An example apparatus includes an architecture evaluator to determine an architecture type of a neural network, a knowledge branch implementor to select a quantity of knowledge branches based on the architecture type, and a knowledge branch inserter to improve a training metric by appending the quantity of knowledge branches to respective layers of the neural network.

24 Claims, 9 Drawing Sheets

(56) References Cited

U.S. PATENT DOCUMENTS

| | | | | |
|---|---|---|---|---|
| 10,853,691 | B1 * | 12/2020 | Webb | G06V 10/82 |
| 11,551,026 | B2 * | 1/2023 | Kim | G06F 9/44505 |
| 2002/0059154 | A1 * | 5/2002 | Rodvold | G06N 3/086 |
| | | | | 706/26 |
| 2005/0114278 | A1 * | 5/2005 | Saptharishi | G06N 3/082 |
| | | | | 706/46 |
| 2011/0029471 | A1 * | 2/2011 | Chakradhar | G06N 3/045 |
| | | | | 706/25 |
| 2014/0079297 | A1 * | 3/2014 | Tadayon | G06V 40/172 |
| | | | | 382/118 |
| 2014/0201126 | A1 * | 7/2014 | Zadeh | A61B 5/165 |
| | | | | 706/52 |
| 2015/0141123 | A1 * | 5/2015 | Callaway | G07F 17/3209 |
| | | | | 463/25 |
| 2016/0117587 | A1 * | 4/2016 | Yan | G06N 3/08 |
| | | | | 706/20 |
| 2017/0140240 | A1 * | 5/2017 | Socher | G06F 18/254 |
| 2018/0203439 | A1 * | 7/2018 | Hattori | G06F 17/18 |
| 2018/0365557 | A1 * | 12/2018 | Kobayashi | G06N 3/126 |
| 2019/0034785 | A1 * | 1/2019 | Murray | G06N 3/084 |
| 2019/0080456 | A1 * | 3/2019 | Song | G06T 7/174 |
| 2019/0114540 | A1 * | 4/2019 | Lee | G06F 40/51 |
| 2019/0180187 | A1 * | 6/2019 | Rawal | G06N 3/044 |
| 2019/0244358 | A1 * | 8/2019 | Shi | G06N 3/09 |
| 2019/0294931 | A1 * | 9/2019 | Risser | G06T 3/4046 |
| 2019/0303762 | A1 * | 10/2019 | Sui | G06N 3/04 |
| 2019/0354837 | A1 * | 11/2019 | Zhou | G06N 3/044 |
| 2020/0090045 | A1 * | 3/2020 | Baker | G06N 3/045 |
| 2020/0193332 | A1 * | 6/2020 | Zhang | G06N 20/20 |
| 2021/0019122 | A1 * | 1/2021 | Kobayashi | G06F 8/34 |
| 2021/0192357 | A1 * | 6/2021 | Sinha | G06N 3/084 |

FOREIGN PATENT DOCUMENTS

| | | |
|---|---|---|
| CN | 106355248 | 1/2017 |
| CN | 106779064 | 5/2017 |

OTHER PUBLICATIONS

X. Jin, Y. Chen, J. Dong, J. Feng, and S. Yan, "Collaborative Layer-wise Discriminative Learning in Deep Neural Networks," In: Leibe, B., Matas, J., Sebe, N., Welling, M. (eds) Computer Vision—ECCV 2016. ECCV 2016. Lecture Notes in Comp. Sci., vol. 9911. Springer, Cham. (Year: 2016).*

International Searching Authority, "International Search Report," mailed in connection with International Patent Application No. PCT/CN2018/096599, on Apr. 28, 2019, 4 pages.

International Searching Authority, "Written Opinion," mailed in connection with International Patent Application No. PCT/CN2018/096599, on Apr. 28, 2019, 4 pages.

International Searching Authority, "International Preliminary Report on Patentability," issued in connection with International Patent Application No. PCT/CN2018/096599, mailed on Feb. 4, 2021, 6 pages.

Krizhevsky et al., "ImageNet Classification with Deep Convolutional Neural Networks," Advances in Neural Information Processing Systems 25 (NIPS 2012), 2012, 9 pages.

Taigman et al., "DeepFace: Closing the Gap to Human-Level Performance in Face Verification," 2014 IEEE Conference on Computer Vision and Pattern Recognition, Jun. 23-28, 2014, 8 pages.

Long et al., "Fully convolutional networks for semantic segmentation," 2015 IEEE Conference on Computer Vision and Pattern Recognition (CVPR), Boston, MA, USA, 2015, 10 pages.

He et al., "Deep Residual Learning for Image Recognition," 2016 IEEE Conference on Computer Vision and Pattern Recognition (CVPR), Las Vegas, NV, USA, 2016, 12 pages.

Huang et al., "Densely Connected Convolutional Networks," 2017 IEEE Conference on Computer Vision and Pattern Recognition, Honolulu, Jul. 21-26, 2017, 9 pages.

Zagoruyko et al., "Wide Residual Networks," arXiv:1605.07146v4 [cs.CV], Jun. 14, 2017, 15 pages.

Silver et al., "Mastering the Game of Go with Deep Neural Networks and Tree Search," Nature 529, 2016, 38 pages.

Xie et al., "Aggregated Residual Transformations for Deep Neural Networks," 2017 IEEE Conference on Computer Vision and Pattern Recognition (CVPR), Honolulu, HI, USA, 2017, 10 pages.

Howard et al., "MobileNets: Efficient Convolutional Neural Networks for Mobile Vision Applications," arXiv:1704.04861v1 [cs. CV] Apr. 17, 2017, 9 pages.

Zoph et al., "Neural Architecture Search With Reinforcement Learning" ICLR, 2017, 16 pages.

Lee et al., "Deeply-Supervised Nets," Artificial Intelligence and Statistics, 2015, 10 pages.

Szegedy et al., "2015 IEEE Conference on Computer Going deeper with convolutions," Vision and Pattern Recognition (CVPR), Boston, MA, USA, 2015 12 pages.

Huang et al., "Multi-Scale Dense Networks for Resource Efficient Image Classification," International Conference on Learning Representations, 2017, 14 pages.

Mets, "Microsoft Neural Net Shows Deep Learning Can Get Way Deeper," Wired, Jan. 14, 2016, 11 pages.

Nielsen, "Neural Networks and Deep Learning," Determination Press, 2015, 63 pages.

Kozyrkov, "The simplest explanation of machine learning you'll ever need" Medium, May 24, 2018, 6 pages.

* cited by examiner

FIG. 3B

METHODS, SYSTEMS, ARTICLES OF MANUFACTURE AND APPARATUS TO TRAIN A NEURAL NETWORK

CROSS-REFERENCE TO RELATED APPLICATION

This patent arises from a 371 Nationalization of International Patent Application Serial No. PCT/CN2018/096599, which is entitled "METHODS, SYSTEMS, ARTICLES OF MANUFACTURE AND APPARATUS TO TRAIN A NEURAL NETWORK," and which was filed on Jul. 23, 2018, the subject matter of which is expressly incorporated herein by reference in its entirety.

FIELD OF THE DISCLOSURE

This disclosure relates generally to artificial intelligence, and, more particularly, to methods, systems, articles of manufacture and apparatus to train a neural network.

BACKGROUND

In recent years, neural networks have been designed with an increasing number of layers, which is sometimes referred to as deep neural networks (DNNs). Typical DNN architectures include any number of hierarchically stacked layers (e.g., convolutional layers, fully connected layers, etc.) having any number of parameters at each layer. The ever increasing depth of such layers enables improvements (e.g., predication accuracy) in trained models when compared to traditional machine learning techniques. DNNs are an industry standard approach for model development in artificial intelligence (AI) tasks. AI tasks include, but are not limited to image classification, face recognition, scene understanding and/or Go-games.

BRIEF DESCRIPTION OF THE DRAWINGS

FIG. 3B illustrates a chart of example ResNet architectures to design knowledge branches of the illustrated example of FIG. 3A.

The figures are not to scale. In general, the same reference numbers will be used throughout the drawing(s) and accompanying written description to refer to the same or like parts.

DETAILED DESCRIPTION

Figure 1:
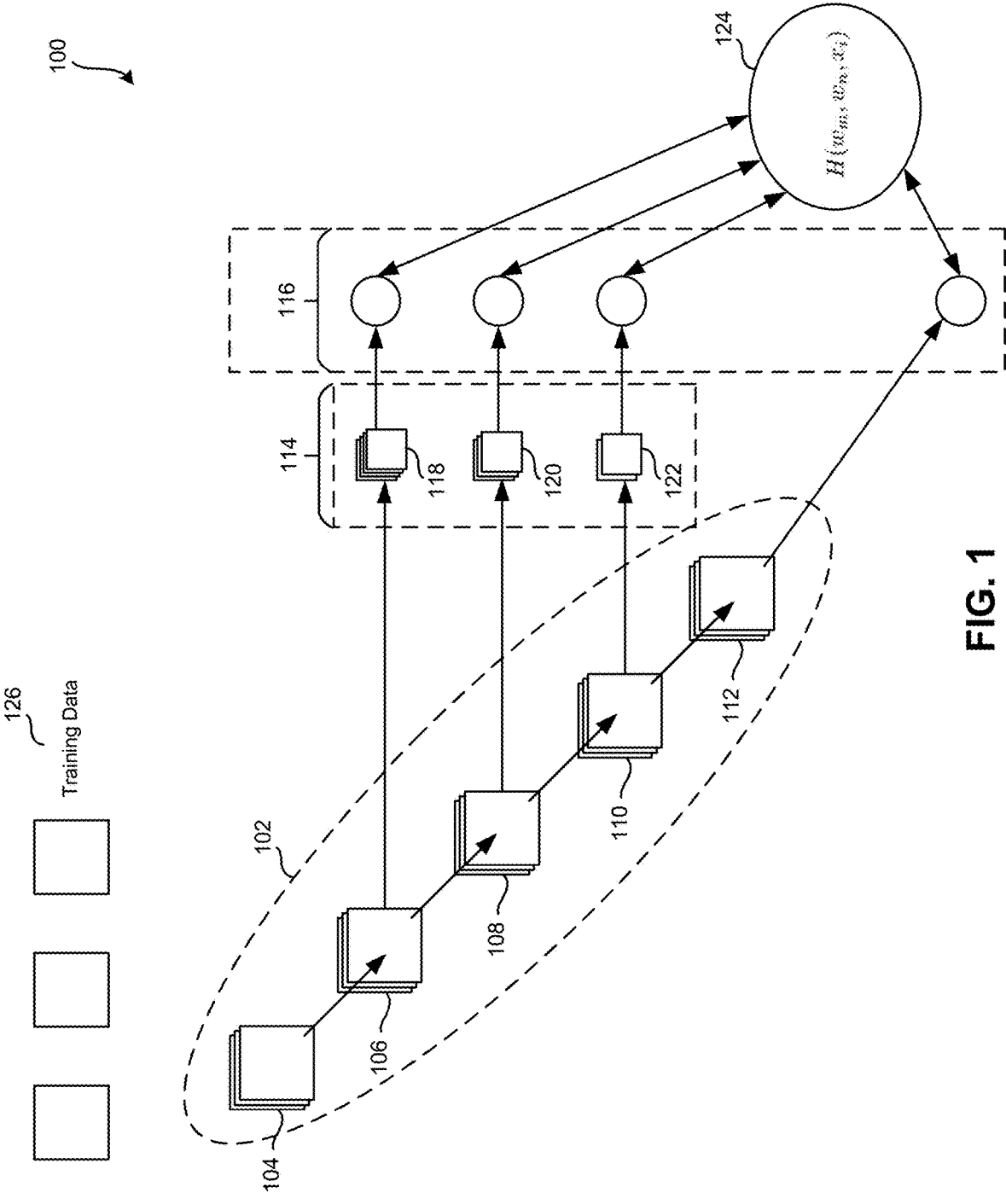
FIG. 1 is a schematic illustration of an improved training framework constructed in accordance with the teachings of this disclosure.

While deep neural networks (DNNs) include a number of hierarchically stacked layers to improve a model (e.g., improvements to the model's representation capability, improvements to the model's predication accuracy, etc.) that results from a training effort, such increasing numbers of layers increase a degree of difficultly during the training effort. In some examples, training operations apply a supervision stage added to a last layer of a network so that error information may be progressively propagated from the last layer to earlier layers. As such, a relatively long path (e.g., for the ResNet-152 architecture) from a top-most feature layer to a relatively lower-level feature layer results in diminished abilities for the architecture to extract and propagate information. In still other examples, the addition of auxiliary supervision layers may ease training convergence, but fails to obtain an accuracy gain. In fact, some efforts to add auxiliary supervision layers degrades one or more accuracy metrics for particular tasks (e.g., classification tasks with large-scale datasets).

Methods, apparatus, articles of manufacture and systems disclosed herein improve neural network (e.g., DNN) training to achieve increased accuracy metrics and/or training metrics (e.g., metrics related to reduced computer processing unit (CPU) cycles, metrics related to reduced training duration, etc.) when compared to state of the art techniques and/or frameworks. Examples disclosed herein evaluate a backbone network (e.g., a provided DNN) to determine candidate knowledge insertion points (e.g., layer positions) and pairwise knowledge interactions that aid the training process of the DNN to produce a resulting model (e.g., a model having trained coefficients, parameters and/or bias values) having improved accuracy metrics when compared to state of the art and/or otherwise traditional training frameworks. Generally speaking, and as described in further detail below, examples herein incorporate network classifiers connected to intermediate layers of the backbone network (e.g., DNN) to gather diverse predication information (sometimes referred to herein as "knowledge") during the training process. Additionally, examples herein optimize and/or otherwise tailor the network classifiers to enable multi-way pairwise interactions therebetween, thereby improving resulting model generalization application and accuracy.

Traditional and/or otherwise state of the art (SOTA) network training optimizers implement an optimization objective to reduce and/or otherwise minimize a network loss during the training process. In some examples, SOTA optimization objectives are implemented in a manner consistent with example Equation 1.

$$\mathrm{argmin} W_C \rightarrow L_C(W_C, D) + \lambda R(W_C). \qquad \text{Equation 1}$$

In the illustrated example of Equation 1, $W_c$ represents an L-layer DNN model that is to be learned during a training process, argmin represents a mathematical minimization convergence, and D represents an annotated data set having N training samples collected from K image classes, as shown in the illustrated example of Equation 2.

$$D = \{(x_i, y_i) \mid 1 \le i \le N\}. \qquad \text{Equation 2}$$

In the illustrated example of Equation 2, $x_i$ represents the $i^{th}$ training sample and $y_i$ represents a corresponding ground-truth label (e.g., a one-hot vector with K dimensions). Briefly returning to the illustrated example of Equation 1, $L_c$ represents a total network loss over all training samples, and $\lambda R$ represents a norm regularization term. The example total network loss ($L_c$) is represented in example Equation 3.

$$L_C(W_C, D) = \frac{1}{N} \sum_{i=1}^{N} H(y_i, f(W_C, x_i)). \qquad \text{Equation 3}$$

In the illustrated example of Equation 3, $f(W_C, x_i)$ represents a K-dimensional output vector of the network for training sample $x_i$. Further, in the illustrated example of Equation 3, H represents a cross-entropy cost function in a manner consistent with example Equation 4.

$$H(y_i, f(W_C, x_i)) = -\sum_{k=1}^{K} y_i^k \log f^k(W_C, x_i). \qquad \text{Equation 4}$$

Again, briefly returning to the illustrated example of Equation 1, the norm regularization term ($\lambda R$) is considered a default term and has no effect or relation to network supervision. Accordingly, the illustrated example Equation 1 above simplifies to a mathematical expression consistent with example Equation 5.

$$\mathrm{argmin} W_C \rightarrow L_C(W_C, D). \qquad \text{Equation 5}$$

As described above, example Equation 1 (and Equation 5) exhibit an optimization objective solved by traditional network training optimizers, in which example Equation 5 may be solved and/or otherwise optimized by application of stochastic gradient descent (SGD). However, such optimizations are only added over a last layer of a network of interest (e.g., a DNN). In particular, to the extent that traditional network training optimizers apply auxiliary classifiers (e.g., support vector machines, simple network classifiers, etc.) that may be attached over one or more hidden layers of a network of interest, example Equation 6 illustrates a resulting optimization objective.

$$\mathrm{argmin}_{W_C, W_a} \rightarrow L_C(W_C, D) + L_a(W_a, D). \qquad \text{Equation 6}$$

In the illustrated example of Equation 6, Wa reflects a set of auxiliary classifiers attached over one or more hidden layers of a network. Wa is expressed in a manner consistent with example Equation 7.

$$W_a = \{w_a^i | 1 \leq l \leq L - 1\}. \qquad \text{Equation 7}$$

Additionally, in the illustrated example of Equation 6, $L_a$ reflects a weighted sum of losses of the example auxiliary classifiers over all training samples, as shown in a manner consistent with example Equation 8.

$$L_a(W_a, D) = \frac{1}{N} \sum_{i=1}^{N} \sum_{l=1}^{L-1} \alpha_l H(y_i, f(w_a^l, x_i)) \qquad \text{Equation 8}$$

In the illustrated example of Equation 8, $a_l$ represents a weighting factor of respective losses of the $i^{th}$ auxiliary classifier $$(w_a^j).$$

The weighted sum of losses is considered and/or otherwise calculated by traditional network training optimizers (e.g., in a manner consistent with example Equation 8), in which gradients are gathered from the last layer of a network of interest and one or more hidden layers. However, this approach also typically achieves no significant accuracy gain or causes an accuracy drop when training DNN models (e.g., classification tasks with large-scale datasets). Examples disclosed herein combat such negative accuracy effects during training while improving an ability to utilize information (e.g., "knowledge") from one or more hidden layers during the training process.

FIG. 1 is a schematic illustration of an improved training framework 100. In the illustrated example of FIG. 1, the framework 100 includes a backbone network 102 having an example first layer 104, an example second layer 106, an example third layer 108, an example fourth layer 110, and an example fifth layer 112. While the illustrated example backbone network 102 of FIG. 1 includes five (5) layers, such layers are for illustrative purposes and examples disclosed herein are not limited thereto. In the illustrated example of FIG. 1, the first layer 104 is referred to as a shallow layer, and the fifth layer 112 is referred to as a deep layer. One or more layers in between the example first layer 104 and the example fifth layer 112 are referred to as intermediate layers. Generally speaking, the example backbone network 102 and corresponding layers are referred to as an architecture of a neural network. The example architecture of a neural network of interest may also exhibit other attributes including, but not limited to types of layers, types and/or quantities of parameters within respective layers, and/or a quantity of layers within the neural network of interest.

The example framework 100 of FIG. 1 also includes knowledge branches 114 in which respective knowledge branches are associated with respective nodes 116. As described above in connection with example Equation 4, and as described in further detail below, the nodes include soft cross-entropy information 124 (generally referred to as knowledge matching loss information). In the illustrated example of FIG. 1, the knowledge branches 114 include a first knowledge branch set 118, a second knowledge branch set 120, and a third knowledge branch set 122. During a training operation of the example backbone network 102, training data set 126 is applied. As used herein, the training data set includes any quantity of images, video, audio and/or text-based data that has been labelled to accurately identify its content. Depending on one or more training objectives for the example backbone network 102, the example training data 126 is used to train the network 102 to establish model parameter values, model coefficient values and/or model bias values so that the model can be applied to/with non-labelled data in an effort to accomplish the model objective (e.g., image classification, text recognition, face recognition, etc.).

Figure 2:
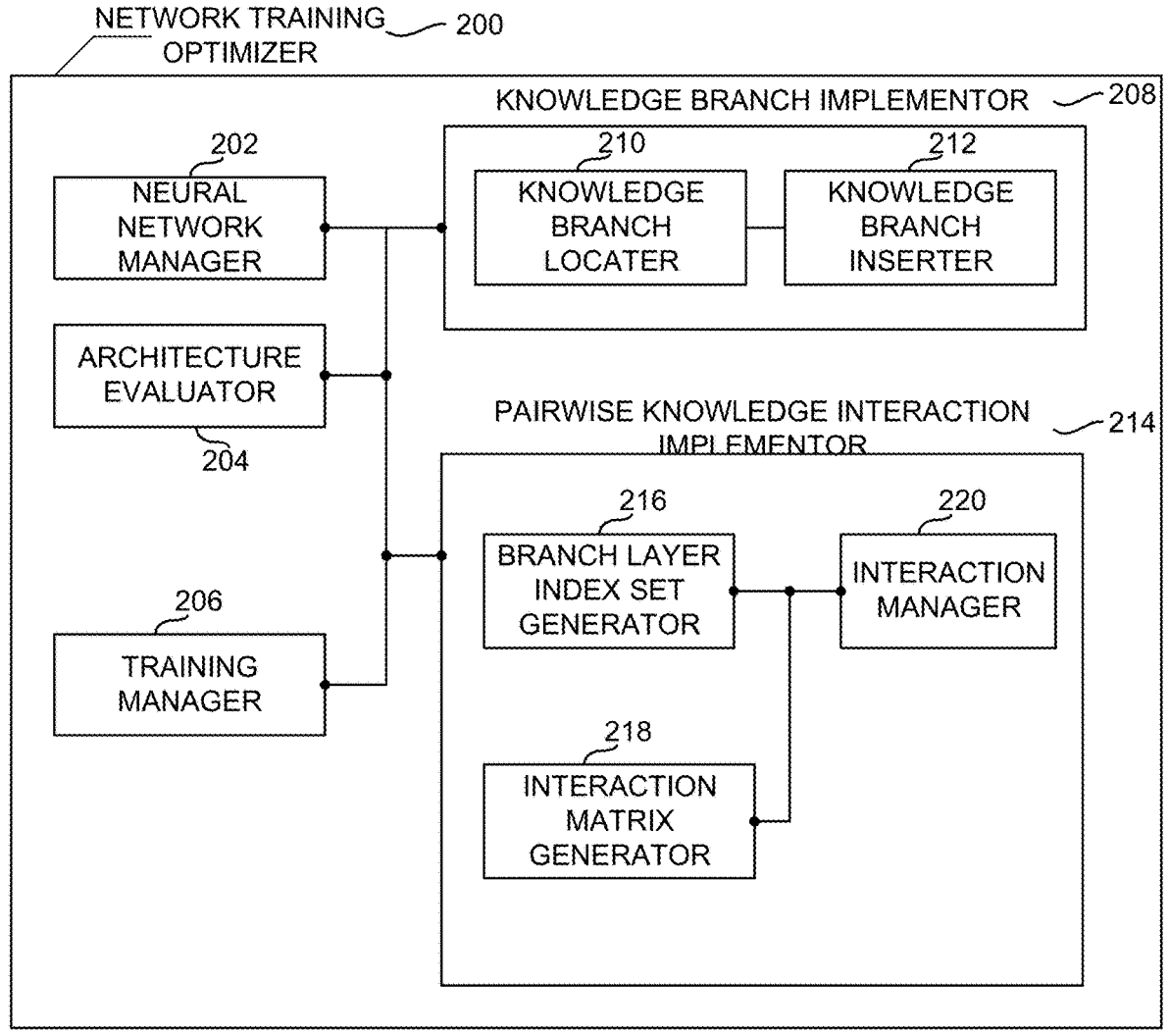
FIG. 2 is a schematic illustration of an example network training optimizer to implement the improved training framework of FIG. 1.

FIG. 2 is a schematic illustration of an example network training optimizer 200 to train a neural network, such as the example backbone network 102 of FIG. 1. In the illustrated example of FIG. 2, the training optimizer 200 includes an example neural network manager 202, an example architecture evaluator 204, an example training manager 206, and an example knowledge branch implementor 208 (sometimes referred to herein as an intermediate knowledge injection (IKI) engine). The example knowledge branch implementor 208 includes an example knowledge branch locator 210 and an example knowledge branch inserter 212. The example network training optimizer 200 of FIG. 2 also includes an example pairwise knowledge interaction implementer 214 (sometimes referred to herein as a pairwise knowledge synergy (PKS) engine). The example pairwise knowledge interaction implementer 214 includes an example branch layer index set generator 216, an example interaction matrix generator 218 and an example interaction manager 220.

In the example of FIG. 2, the example neural network manager 202 is a means for managing a neural network or a neural network managing means. In the example of FIG. 2, the example architecture evaluator 204 is a means for determining an architecture or a determining means. In the example of FIG. 2, the example training manager 206 is a means for training or a training means. In the example of FIG. 2, the example knowledge branch implementor 208 is a means for selecting or a selecting means. In the example of FIG. 2, the example knowledge branch locator 210 is a means for identifying or an identifying means. In the example of FIG. 2, the example knowledge branch inserter 212 is a means for improving or an improving means. In the example of FIG. 2, the example pairwise knowledge interaction implementer 214 is a means for pairwise knowledge implementation or a pairwise knowledge implementation means. In the example of FIG. 2, the example branch layer index set generator 216 is a means for branch layer index set generation or a branch layer index set generation means. In the example of FIG. 2, the example interaction matrix generator 218 is a means for interaction matrix generation or an interaction matrix generation means. In the example of FIG. 2, the example interaction manager 220 is a means for identifying interaction locations, a means for identifying insertion locations, or an interaction means.

In operation, the example neural network manager 202 acquires and/or otherwise retrieves a neural network, such as the example backbone network 102 of FIG. 1, and the example architecture evaluator 204 quantifies the acquired neural network. In some examples, the architecture evaluator 204 identifies an architecture type of the neural network, which may include identifying a number of layers of the neural network, identifying the types of layers, identifying parameters (e.g., quantities of parameters) in each layer, identifying a number of shallow layers of the neural network, identifying a number of intermediate layers of the neural network, identifying an objective of the retrieved backbone network, etc. Generally speaking, for DNNs, features learned in relatively shallow layers have relatively fine spatial resolution, but lack semantic meanings/associations. As such, abilities to discriminate (e.g., whether the image is associated with a cat or a dog) at such relatively shallow layers is much worse in comparison to features of relatively deeper layers. Through direct loss summation, such poor predication outputs from auxiliary classifiers attached over shallow layers usually have negative effects to the training process, thereby hurting final model accuracy to a certain degree. Accordingly, examples disclosed herein consider and/or otherwise calculate performance of the auxiliary classifiers in context of the whole network to help guide the accuracy of the training process. To illustrate, the example optimization objective of Equation 6 that is applied to traditional training processes lacks a comprehensive interaction effect of classifiers (e.g., network classifiers) with the whole network. Instead, such traditional approaches are constrained to application or adjustment in connection with a last (deepest) layer after all intermediate layers (with one or more auxiliary classifiers) have contributed to the training process.

Examples disclosed herein append knowledge branches to particular layers (e.g., hidden layers) of the backbone network 102 to facilitate knowledge extraction during the training process. The example knowledge branch implementer 208 selects a quantity of branches (e.g., added network classifiers) to append to the backbone network 102. In some instances, the quantity of branches to be inserted/appended is based on a quantity of the layers of the backbone neural network. For example, the knowledge branch implementer 208 may apply one or more formulae, including a branch factor, to determine a number of network classifiers (Q) to add based on a known number of existing layers in the backbone network 102 in a manner consistent with example Equations 9 or 10.

$$Q = (TotalLayers) - int\left(\frac{TotalLayers}{BF}\right). \qquad \text{Equation 9}$$

$$Q = int[(TotalLayers) * BF]. \qquad \text{Equation 10}$$

In the illustrated examples of Equation 9 and Equation 10, TotalLayers represents a number of layers determined by the example architecture evaluator 204, and BF represents a branch factor (e.g., a value of 2 in Equation 9 or a value of 0.1 in Equation 10). In some examples, too many classifiers (e.g., network classifiers) can exhibit diminished training performance and, based on empirical observations related to training performance (e.g., convergence metrics, error metrics, etc.), one or more factors of example Equations 9 and/or 10 may be altered. For instance, the multiplicative value of 0.1 of Equation 10 may be changed to a relatively higher number to cause an increased number of network classifiers to be added to the backbone network 102 during the training process.

In some examples, the knowledge branch locator 210 identifies candidate insertion locations of the neural network 102. For instance, the example knowledge branch locator 210 calculates a middle layer of the example backbone network 102 of FIG. 1 and the example knowledge branch inserter 212 improves a training metric (e.g., an accuracy of the training process, a reduction in errors in the training process, etc.) of the neural network by inserting a knowledge branch (e.g., a network classifier—Q) at candidate insertion locations of a neural network (e.g., inserting a first network classifier at/near the middle layer (e.g., the example third layer 108 of FIG. 1)). After inserting a network classifier, the example knowledge branch implementer 208 decrements a count of the number of inserted/appended branches and further improves a training metric of the neural network by determining whether one or more additional branches are to be appended to the example backbone network 102. For instance, if five (5) network classifiers were to be added to the backbone network 102, the example knowledge branch implemented 208 decrements the count of five by one, which results in four more network classifiers to be added to the backbone network 102. In some examples, the knowledge branch locator 210 distributes network classifier insertion above and below the determined middle layer. For instance, the example knowledge branch locator traverses an index or pointer to the example backbone network 102 upwards or downwards by a step size (e.g., a step size of one layer, a step size of three layers, etc.), and the example knowledge branch inserter 212 inserts/appends another network classifier (knowledge branch) at that location. The example process of appending/inserting may continue until the number of target branches (network classifiers) is inserted to their respective locations within the example backbone network 102.

In addition to inserting/appending knowledge branches into particular locations of a backbone network 102, examples disclosed herein establish a communicative relationship between any pair of such inserted knowledge branches and a default top-most classifier. The example branch layer index set generator 216 generates a branch layer matrix to identify relative locations of inserted/appended knowledge branches into the example backbone network 102. In some examples, the branch layer index set generator 216 generates the vector in a manner consistent with example Equation 11.

$$I_A(l) = \begin{cases} 1 & \text{if } l \in A \\ 0 & \text{otherwise} \end{cases}. \qquad \text{Equation 11}$$

In the illustrated example of Equation 11, A is a set (e.g., a predefined set) of layers (of the backbone network) with |A| layer indices, which indicate where auxiliary network classifiers (branches) are added. In particular, $I_A(l)$ denotes the existence of respective auxiliary network classifiers connected to the $I^{th}$ layer, where $I_A(l)=1$, $1 \le l \le L-1$. Here, L denotes the number of layers of an example backbone network.

Figure 3A:
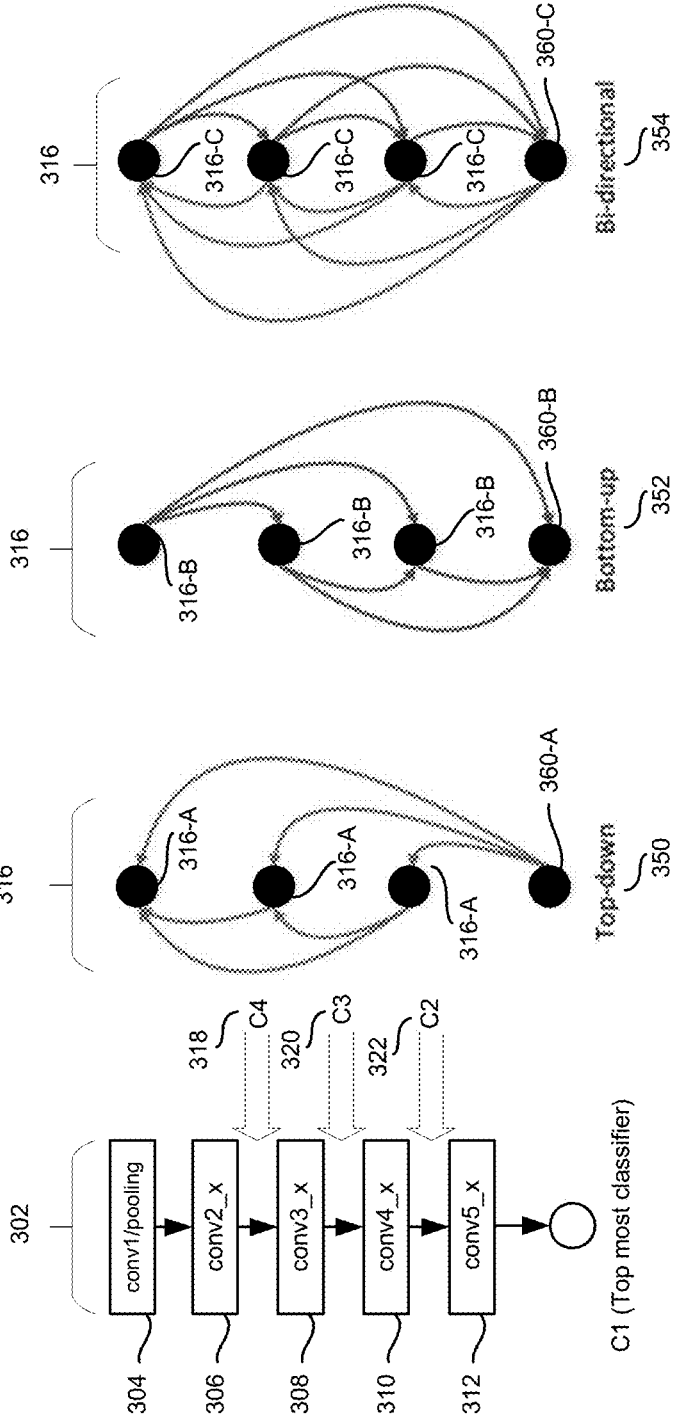
FIG. 3A illustrates example knowledge interaction structures generated by the example network training optimizer of FIG. 2.

The example interaction manager 220 determines a pairwise knowledge interaction structure/framework to be applied to the appended knowledge branches. FIG. 3A illustrates example knowledge interaction structures that may be selected. In the illustrated example of FIG. 3A, similarities to the illustrated example of FIG. 1 are represented with similar reference numbers in a 300-series (e.g., an example backbone network 302 is shown as reference number 302 to indicate similarity to the example backbone network 102 of FIG. 1). The example backbone network 302 includes an example first layer 304, an example second layer 306, an example third layer 308, an example fourth layer 310 and an example fifth layer 312. Additionally, the example backbone network 302 includes an example first knowledge branch set 318 ($C_4$), an example second knowledge branch set 320 ($C_3$), and an example third knowledge branch set 322 ($C_2$). As used herein, knowledge branches and/or knowledge branch sets are sometimes referred to as network classifiers.

Figure 3B:
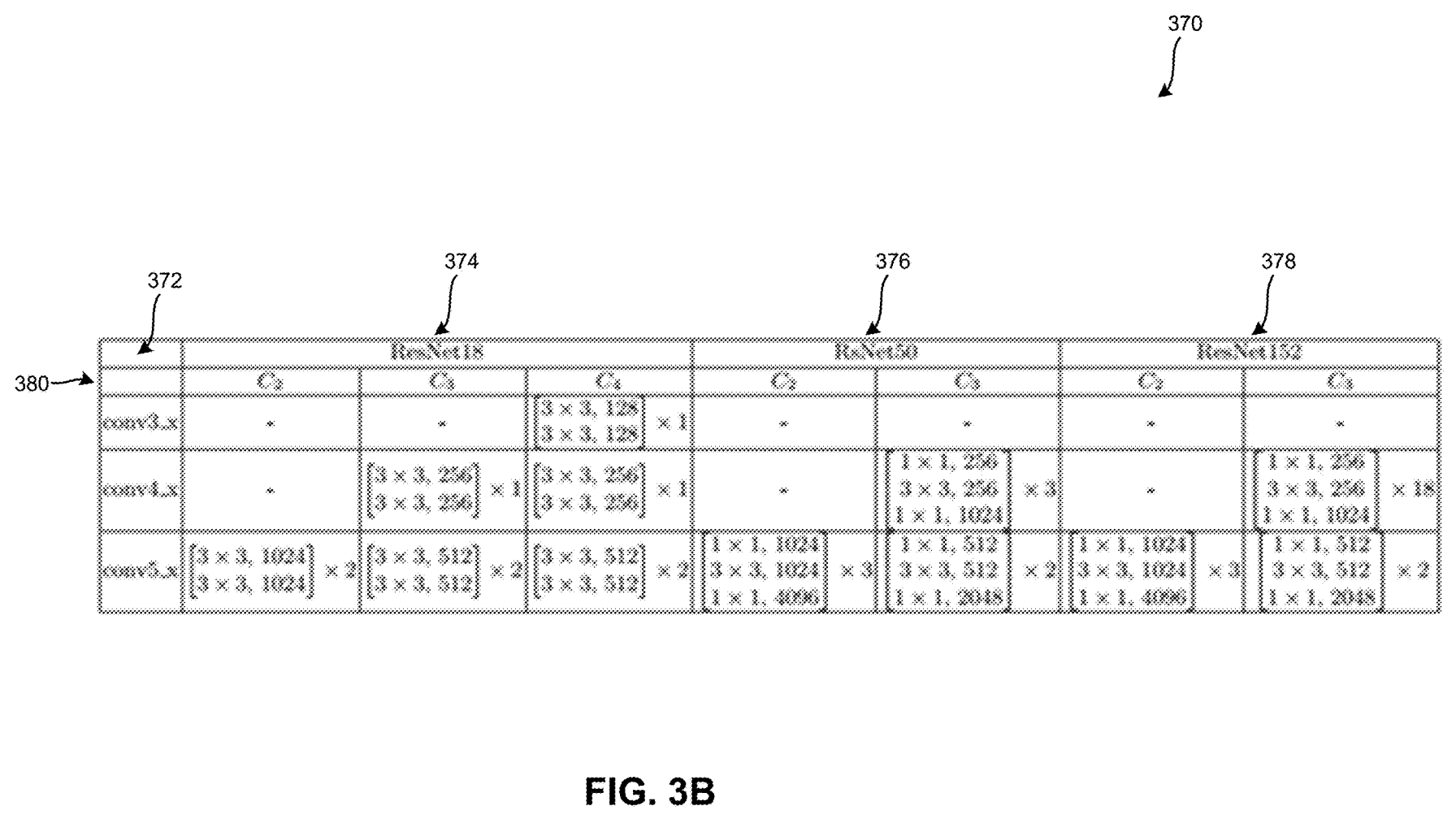

FIG. 3B illustrates a chart 370 of example ResNet architectures used to design example knowledge branches, such as the example first knowledge branch set 318 ($C_4$), the example second knowledge branch set ($C_3$) 320, and the example third knowledge branch set 322 ($C_2$). In the illustrated example of FIG. 3B, the chart 370 includes a layer column 372, a ResNet18 column 374, a ResNet50 column 376 and a ResNet152 column 378. The example chart 370 of FIG. 3B also includes a knowledge branch row 380 to define knowledge branches for respective ResNet variants. Cells within the example chart 370 of FIG. 3B illustrate corresponding numbers of convolutional blocks (e.g., basic blocks for ResNet18, and bottleneck blocks for ResNet50 and ResNet152). Generally speaking, knowledge branches are designed with similar building blocks as an underlying backbone network. To guarantee that all paths from an input to different knowledge branch outputs have a same down-sampling process, the knowledge branches are designed according to the corresponding building blocks in the backbone network. For example, the knowledge branch $C_3$ has its own conv4× layer and conv5× layer acting as down-sampling stages, whose parameter size is smaller than that of the corresponding stages in the backbone network. After example down-sampling stages, examples disclosed herein may include global average pooling layers and fully connected layers.

To enable knowledge transfers between knowledge branches (e.g., $C_2$, $C_3$, $C_4$) during training operations, the example interaction manager 220 selects one of a top-down knowledge interaction framework 350, a bottom-up knowledge interaction framework 352, or a bi-directional knowledge interaction framework 354. Each of the example knowledge interaction frameworks of FIG. 3 is associated with example respective nodes 116 of example respective knowledge branches (e.g., the example first knowledge branch set 318, the example second knowledge branch set 320, the example third knowledge branch set 322).

In the illustrated example of FIG. 3, the interaction manager 220 selects the example top-down knowledge interaction framework 350 to cause knowledge of relatively deeper layers (see node 360-A, which is referred to as (a) a top-most network classifier of a neural network and/or (b) a relatively deepest layer of the neural network) to be shared with relatively more shallow layers/nodes (see nodes 316-A). However, in other examples the interaction manager 220 selects the example bottom-up knowledge interaction framework 352 to cause knowledge of relatively shallow layers (see nodes 316-B) to be shared with a relatively deepest layer of the neural network (see node 360-B). In still other examples, the interaction manager 220 selects the example bi-directional knowledge framework 354 to cause bi-directional knowledge transfer between all layers/nodes. By selecting a candidate knowledge interaction framework, examples disclosed herein facilitate information-sharing of different level feature layers of a given backbone network. In effect, such knowledge interaction enhances training error information propagation and reduces testing error as compared to conventional/traditional training methods, such as those techniques that only consider error information associated with a last/deepest node.

Based on the knowledge interaction structure/framework selected by the example interaction manager 220, the example interaction matrix generator 218 generates a knowledge interaction matrix in a manner consistent with example Equation 12.

$$T_B(m, n) = \begin{cases} 1 & \text{if } (m, n) \in B \\ 0 & \text{otherwise} \end{cases}. \qquad \text{Equation 12}$$

In the illustrated example of Equation 12, $T_B$ is a binary indicator function in which B reflects a set (e.g., a predefined set) of layers (of the backbone network) with |B| pairs of layer indices that identify where pair-wise knowledge interactions are to be activated. In particular, $T_B(m,n)=1$, where $1 \le m$, $n \le |\hat{A}|$ denotes a knowledge interaction from a network classifier (m) to another network classifier (n) is activated. Here, $|\hat{A}|$ denotes the union of A (in a manner consistent with example Equation 11) and the index of the last layer of the backbone network. Stated differently, the illustrated example of Equation 11 identifies and/or otherwise establishes where network classifiers are added to the backbone network, and the illustrated example of Equation 12 identifies and/or otherwise establishes an information/knowledge transfer framework between respective network classifiers.

The example pairwise knowledge interaction implementor 214 defines an optimization goal of the backbone network. In particular, the example optimization goal includes particular added/inserted/appended knowledge branches (e.g., particular network classifiers) and the manner by which such knowledge branches interact with each other. The example optimization goal is represented in a manner consistent with example Equation 13.

$$\underset{W_C, W_a}{\operatorname{argmin}} \rightarrow L_c(W_C, D) + L_a(W_a, I_A, D) + L_k(W_{\hat{A}}, T_B, D) \qquad \text{Equation 13}$$

In the illustrated example of Equation 13, a represents all possible auxiliary network classifiers connected to hidden layers of an example backbone network, and $I_A$ restricts auxiliary network classifiers to be only connected with particular (e.g., pre-defined) layers (see example Equation 14 below). $L_k$ defines the knowledge interactions between knowledge pairs, and $L_a$ is represented in a manner consistent with example Equation 14.

$$L_a(W_a, I_A, D) = \frac{1}{N} \sum_{i=1}^{N} \sum_{l=1}^{L-1} I_A(l)(\alpha_l H(y_i, f(w_a^l, x_i))). \qquad \text{Equation 14}$$

Additionally, in the illustrated example of Equation 13, $L_k$ is represented in a manner consistent with example Equation 15.

$$L_k(W_{\hat{A}}, T_B, D) = \frac{1}{N} \sum_{i=1}^{N} \sum_{m=1}^{|\hat{A}|} \sum_{n=1}^{|\hat{A}|} T_B(m, n) H(w_m, w_n, x_i). \qquad \text{Equation 15}$$

In the illustrated example of Equation 15, $w_m \in W_{\hat{A}}$, and $w_n \in W_{\hat{A}}$. Additionally, $H(w_m, w_n, x_i)$ is defined in a manner consistent with example Equation 16.

$$H(w_m, w_n, x_i) = -\beta_{mn} \sum_{k=1}^{K} f^k(w_m, x_i) \log(f^k(w_n, x_i)). \qquad \text{Equation 16}$$

In the illustrated example of Equation 16 $\beta_{mn}$ is a positive coefficient indicative of a confidence of the knowledge interaction from the network classifier (m) to the network classifier (n). In some examples, and for ease of implementation, $\beta_{mn}=1$. Additionally, for the training sample $x_i f^k(w_m, x_i)$ and $f^k(w_n, x_i)$ denote a probability of the $k^{th}$ class obtained from respective network classifiers m and n, respectively. In some examples, a softmax and/or normalized exponential function is employed to compute such class probabilities.

As shown by the illustrated example of Equation 16, knowledge/information interaction among any pair of network classifiers (e.g., a union of all auxiliary network classifiers and a top-most network classifier) is defined as a soft cross-entropy loss function. Thus, taking current class probability outputs from network classifier m as the soft labels (e.g., fixed as a constant vector temporally), it forces probabilistic predication outputs from the network classifier n to be as similar as possible. As such, the knowledge/information learned by the network classifier m can be transferred to network classifier n. Additionally, by enabling dense knowledge/information interactions among different pairs of network classifiers (e.g., in an "on-the-fly" manner), examples disclosed herein enhance a capability of information flows across the whole network, improve model generalization abilities, and reduce error.

While an example manner of implementing the example network training optimizer 200 of FIG. 2 is illustrated in FIGS. 1-3, one or more of the elements, processes and/or devices illustrated in FIG. 2 may be combined, divided, re-arranged, omitted, eliminated and/or implemented in any other way. Further, the example neural network manager 202, the example architecture evaluator 204, the example training manager 206, the example knowledge branch implementor 208, the example knowledge branch locator 210, the example knowledge branch inserter 212, the example pairwise knowledge interaction implementor 214, the example branch layer index set generator 216, the example interaction matrix generator 218, the example interaction manager 220 and/or, more generally, the example network training optimizer 200 of FIG. 2 may be implemented by hardware, software, firmware and/or any combination of hardware, software and/or firmware. Thus, for example, any of the example neural network manager 202, the example architecture evaluator 204, the example training manager 206, the example knowledge branch implementor 208, the example knowledge branch locator 210, the example knowledge branch inserter 212, the example pairwise knowledge interaction implementor 214, the example branch layer index set generator 216, the example interaction matrix generator 218, the example interaction manager 220 and/or, more generally, the example network training optimizer 200 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example neural network manager 202, the example architecture evaluator 204, the example training manager 206, the example knowledge branch implementor 208, the example knowledge branch locator 210, the example knowledge branch inserter 212, the example pairwise knowledge interaction implementor 214, the example branch layer index set generator 216, the example interaction matrix generator 218, the example interaction manager 220 and/or, more generally, the example network training optimizer 200 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example network training optimizer 200 of FIG. 2 may include one or more elements, processes and/or devices in addition to, or instead of, those illustrated in FIGS. 1-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example network training optimizer 200 of FIG. 2 are shown in FIGS. 4-7. The machine readable instructions may be one or more executable programs or portions of an executable program for execution by a computer processor such as the processor 812 shown in the example processor platform 800 discussed below in connection with FIG. 8. The program(s) may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4-7, many other methods of implementing the example network training optimizer 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 4:
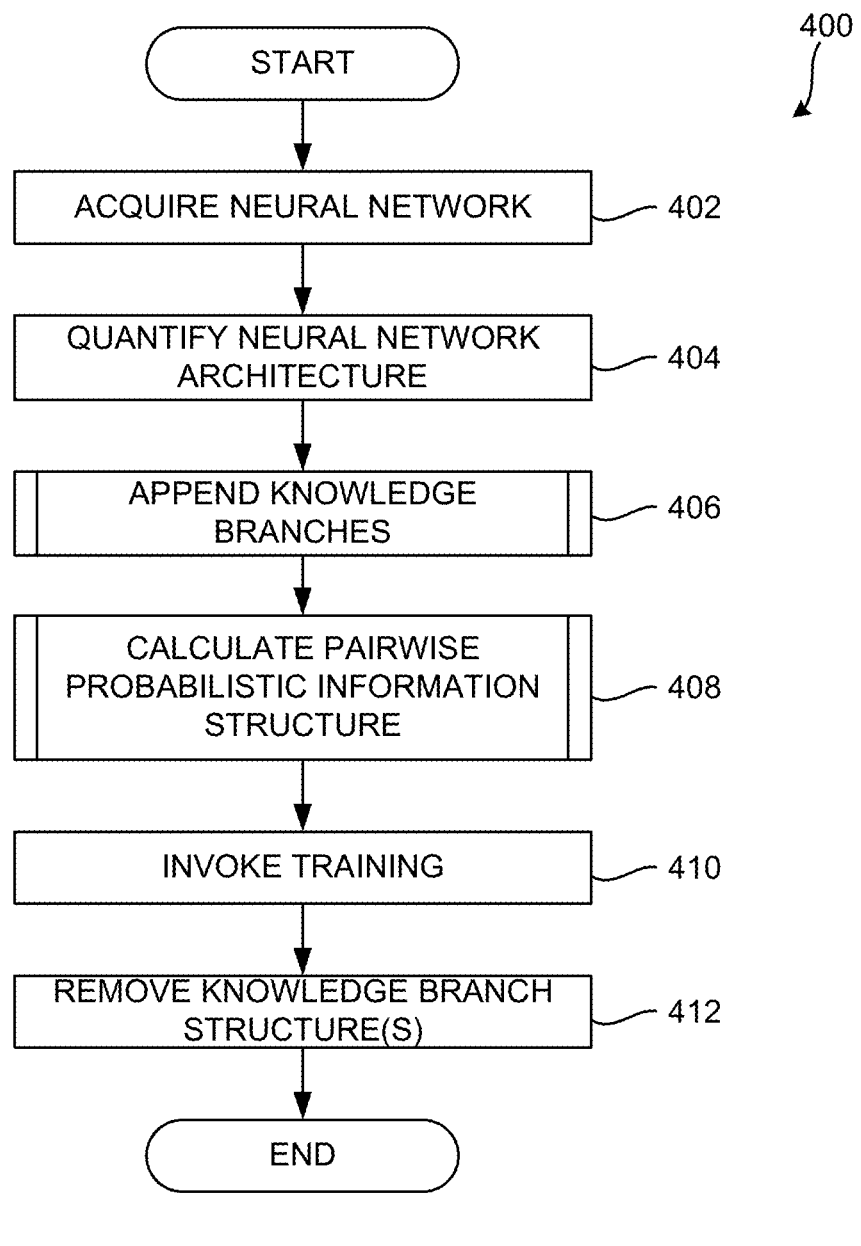
FIGS. 4-7 are flowcharts representative of machine readable instructions which may be executed to implement the example network training optimizer of FIG. 2 and/or the example improved training framework of FIG. 1.

The program 400 of FIG. 4 begins at block 402, where the example network manager 202 acquires a neural network that is to be trained. As described above, a retrieved neural network is sometimes referred to herein as a backbone network and may include any number of layers, in which general industry parlance refers to a relatively high number of layers as a deep neural network (DNN). However, examples disclosed herein apply to neural networks having any number of layers. The example architecture evaluator 204 quantifies the retrieved neural network (block 404) to extract and/or otherwise identify one or more characteristics therein. In some examples, the architecture evaluator 204 determines a number of layers, a number and/or type of shallow layer, a number and/or type of intermediate layer, a number and/or type of deep layer, the parameter numbers in each layer, and/or an objective of the retrieved backbone network. The example knowledge branch implementor 208 appends knowledge branches (sometimes referred to herein as network classifiers or auxiliary classifiers) (block 406) in particular locations of the backbone network, and the example pairwise knowledge interaction implementor 214 establishes a communication framework between the appended knowledge branches (block 408). The example training manager 206 invokes a training process for the augmented backbone network (block 410), and the example knowledge branch implementor 208 removes all knowledge branch structure(s) from the augmented backbone network (block 412), thereby preventing any need to process and/or store additional data structures associated with the backbone network during one or more runtime processes.

Figure 5:
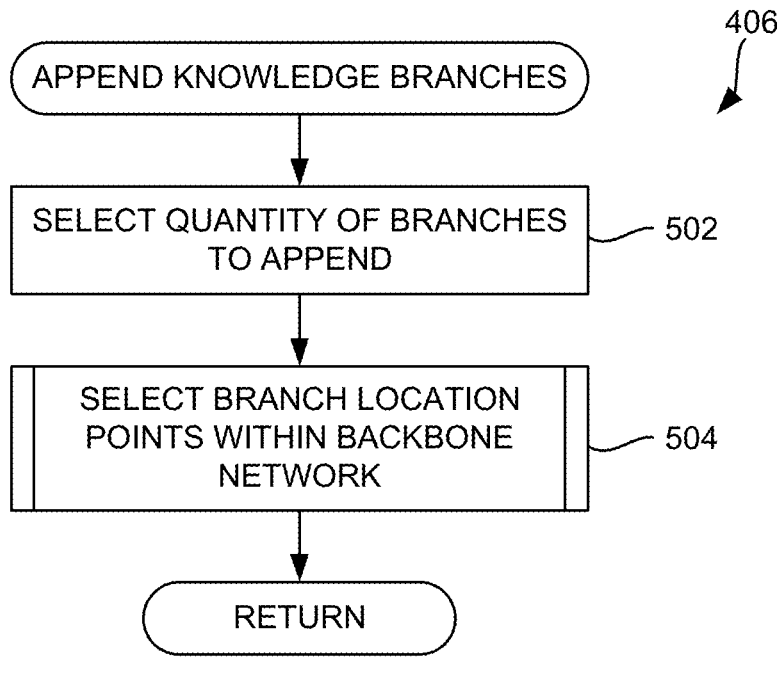

FIG. 5 illustrates additional detail associated with appending knowledge branches (block 406) of FIG. 4. In the illustrated example of FIG. 5, the example knowledge branch implementor 208 selects a quantity of branches to append to the backbone network (block 502). The example knowledge branch locator 210 selects one or more branch location points within the example backbone network (block 504), as described above and in further detail in connection with FIG. 6.

Figure 6:
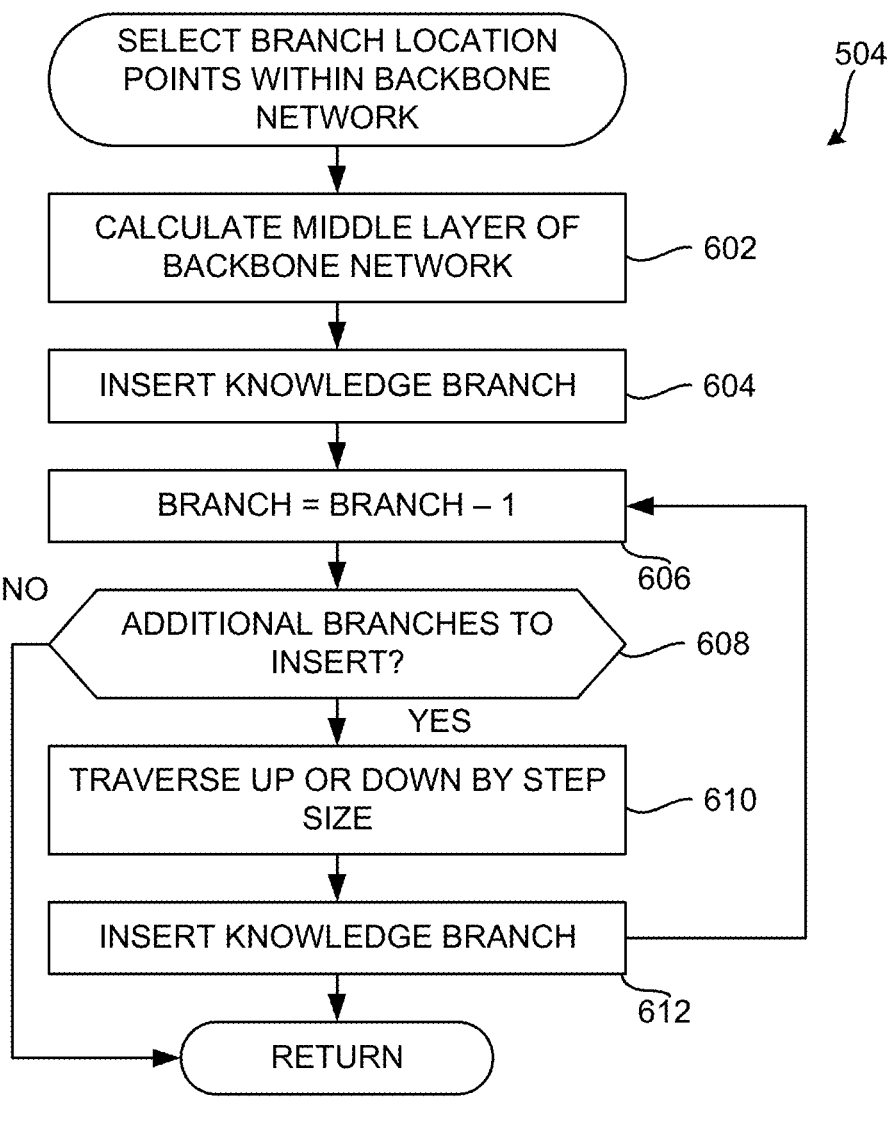

FIG. 6 illustrates additional detail associated with selecting branch location points within the backbone network (block 504) of FIG. 5. In the illustrated example of FIG. 6, the knowledge branch locator 210 calculates a middle layer of the backbone network (block 602), and the example knowledge branch inserter 212 inserts one of the knowledge branches into the backbone network at that designated location (block 604). The example knowledge branch implementor 208 decrements a count value that tracks a number of knowledge branches inserted into the backbone network (block 606), and determines whether one or more additional knowledge branches are to be inserted into the backbone network (block 608). If so, the example knowledge branch locator 210 traverses up or down (e.g., an index pointer) by a step size (e.g., every 1-layer, every other layer, every 3-layers, etc.) (block 610), and the example knowledge branch inserter 212 inserts the knowledge branch into the designated location of the backbone network (block 612). Control returns to block 606 to continue tracking the number of knowledge branches inserted into the backbone network, and if there are no further knowledge branches to be inserted (block 608), the example program 504 of FIG. 6 returns to block 408 of FIG. 4.

Figure 7:
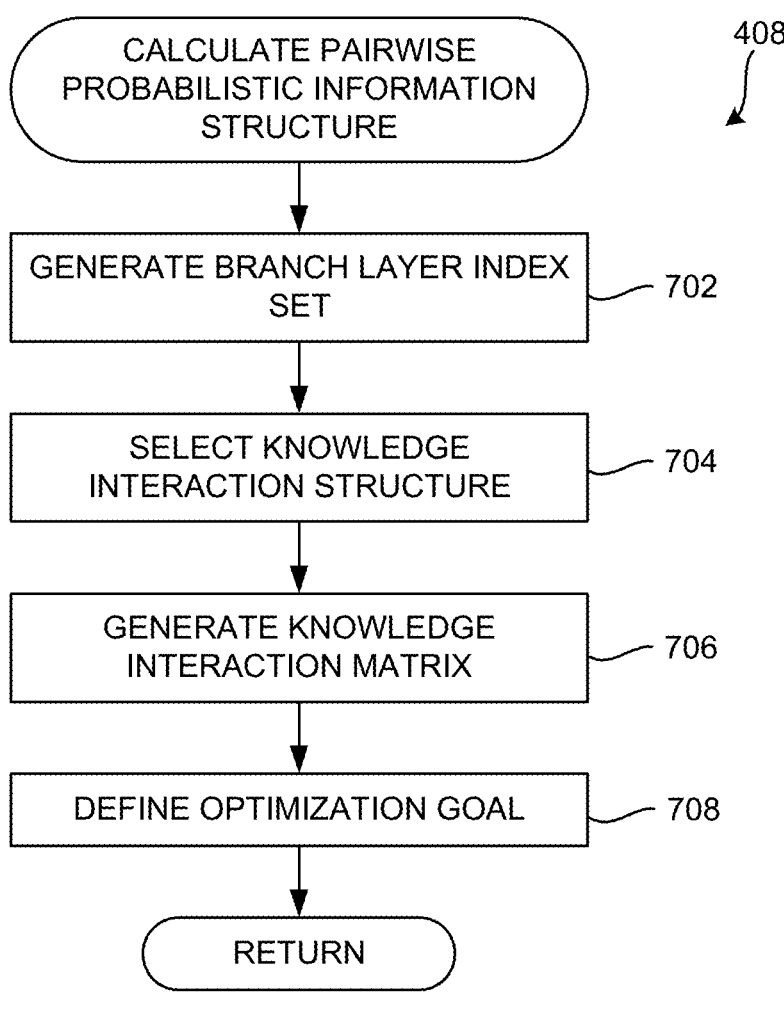

FIG. 7 illustrates additional detail associate with calculating pairwise probabilistic information structures (block 408) of FIG. 4. In the illustrated example of FIG. 7, the branch layer index set generator 216 generates a branch layer matrix (block 702) in a manner consistent with example Equation 11. The example interaction manager 220 selects a desired knowledge interaction structure/framework (block 704), such as candidate frameworks in the illustrated example of FIG. 3. In connection with the appended knowledge branches identified by the example branch layer index set, the example interaction matrix generator 218 generates a knowledge interaction matrix (block 706) to designate and/or otherwise assign a particular relationship between all pairs of knowledge branches (e.g., network classifiers) of the augmented backbone network. As described above, the example interaction matrix generator 218 may generate the interaction matrix in a manner consistent with example Equation 12. The example pairwise knowledge interaction implementor 214 defines an optimization goal (block 708) in a manner consistent with example Equation 13 that drives the desired optimization goal during the training of the augmented backbone network. Control then returns to block 410 of FIG. 4.

Figure 8:
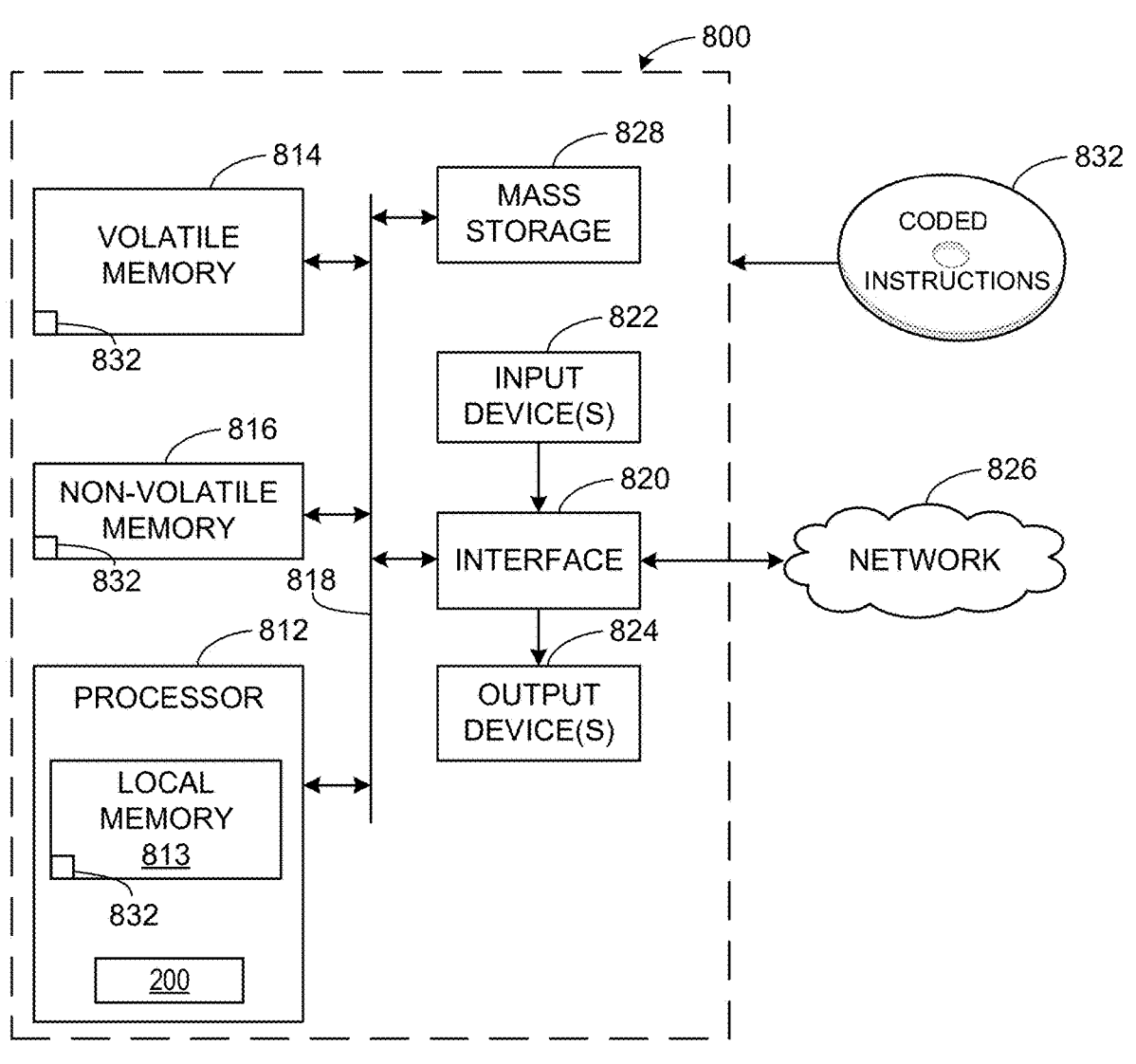
FIG. 8 is a block diagram of an example processing platform structured to execute the instructions of FIGS. 4-7 to implement the example network training optimizer of FIG. 2.

FIG. 8 is a block diagram of an example processor platform 800 structured to execute the instructions of FIGS. 4-7 to implement the network training optimizer of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network manager 202, the example architecture evaluator 204, the example training manager 206, the example knowledge branch implementor 208, the example knowledge branch locator 210, the example knowledge branch inserter 212, the example pairwise knowledge interaction implementor 214, the example branch layer index set generator 216, the example interaction matrix generator 218, the example interaction manager 220 and/or, more generally, the example network training optimizer 200 of FIG. 2.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device (s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 4-7 may be stored in the mass storage device 828, in the volatile memory 814, in the non-volatile memory 816, and/or on a removable non-transitory computer readable storage medium such as a CD or DVD.

From the foregoing, it will be appreciated that example methods, systems, apparatus and articles of manufacture have been disclosed that improve knowledge/information transfer at a more granular layer-level of detail during a training process of a backbone neural network. By inserting knowledge branches (network classifiers) at one or more layers of the backbone neural network, such insertion permits an information transfer therebetween during the training process to enhance training error information flows across the whole network, thereby achieving improved predication accuracy, improved inference accuracy and/or improved testing accuracy of the trained model. The disclosed methods, apparatus and articles of manufacture improve the efficiency of using a computing device by facilitating a relatively earlier convergence during network training and a corresponding reduction in a number of training iterations required during the training process. The disclosed methods, systems, apparatus and articles of manufacture are accordingly directed to one or more improvement (s) in the functioning of a computer.

Example 1 includes an apparatus to train a neural network, the apparatus comprising an architecture evaluator to determine an architecture type of a neural network, a knowledge branch implementor to select a quantity of knowledge branches based on the architecture type, and a knowledge branch inserter to improve a training metric by appending the quantity of knowledge branches to respective layers of the neural network.

Example 2 includes the apparatus as defined in example 1, wherein the knowledge branch implementor is to calculate the quantity of knowledge branches based on a quantity of layers associated with the neural network.

Example 3 includes the apparatus as defined in example 2, wherein the knowledge branch implementor is to divide the quantity of layers associated with the neural network by a branch factor to calculate the quantity of knowledge branches.

Example 4 includes the apparatus as defined in example 1, further including a branch locator to identify candidate insertion locations of the neural network.

Example 5 includes the apparatus as defined in example 4, wherein the branch locator is to calculate a middle layer associated with the neural network.

Example 6 includes the apparatus as defined in example 4, wherein the knowledge branch inserter is to insert one of the quantity of knowledge branches at one of the candidate insertion locations.

Example 7 includes the apparatus as defined in example 1, further including an insertion manager to select a knowledge interaction framework for the quantity of knowledge branches.

Example 8 includes the apparatus as defined in example 7, wherein the knowledge interaction framework includes at least one of a top-down knowledge interaction framework, a bottom-up knowledge interaction framework, or a bi-directional knowledge interaction framework.

Example 9 includes the apparatus as defined in example 7, further including a pairwise knowledge interaction implementor to define an optimization goal, the optimization goal to include the selected knowledge interaction framework.

Example 10 includes a non-transitory computer readable medium comprising instructions that, when executed, cause at least one processor to determine an architecture type of a neural network, select a quantity of knowledge branches based on the architecture type, and improve a training metric by appending the quantity of knowledge branches to respective layers of the neural network.

Example 11 includes the computer readable medium as defined in example 10, wherein the instructions, when executed, cause the at least one processor to calculate the quantity of knowledge branches based on a quantity of layers associated with the neural network.

Example 12 includes the computer readable medium as defined in example 11, wherein the instructions, when executed, cause the at least one processor to divide the quantity of layers associated with the neural network by a branch factor to calculate the quantity of knowledge branches.

Example 13 includes the computer readable medium as defined in example 10, wherein the instructions, when executed, cause the at least one processor to identify candidate insertion locations of the neural network.

Example 14 includes the computer readable medium as defined in example 13, wherein the instructions, when executed, cause the at least one processor to calculate a middle layer associated with the neural network.

Example 15 includes the computer readable medium as defined in example 13, wherein the instructions, when executed, cause the at least one processor to insert one of the quantity of knowledge branches at one of the candidate insertion locations.

Example 16 includes the computer readable medium as defined in example 10, wherein the instructions, when executed, cause the at least one processor to select a knowledge interaction framework for the quantity of knowledge branches.

Example 17 includes the computer readable medium as defined in example 16, wherein the instructions, when executed, cause the at least one processor to implement the knowledge interaction framework as at least one of a top-down knowledge interaction framework, a bottom-up knowledge interaction framework, or a bi-directional knowledge interaction framework.

Example 18 includes the computer readable medium as defined in example 16, wherein the instructions, when executed, cause the at least one processor to define an optimization goal, the optimization goal to include the selected knowledge interaction framework.

Example 19 includes a computer implemented method to train a neural network, the method comprising determining, by executing an instruction with at least one processor, an architecture type of a neural network, selecting, by executing an instruction with the at least one processor, a quantity of knowledge branches based on the architecture type, and improving, by executing an instruction with the at least one processor, a training metric by appending the quantity of knowledge branches to respective layers of the neural network.

Example 20 includes the method as defined in example 19, further including calculating the quantity of knowledge branches based on a quantity of layers associated with the neural network.

Example 21 includes the method as defined in example 20, further including dividing the quantity of layers associated with the neural network by a branch factor to calculate the quantity of knowledge branches.

Example 22 includes the method as defined in example 19, further including identifying candidate insertion locations of the neural network.

Example 23 includes the method as defined in example 22, further including calculating a middle layer associated with the neural network.

Example 24 includes the method as defined in example 22, further including inserting one of the quantity of knowledge branches at one of the candidate insertion locations.

Example 25 includes the method as defined in example 19, further including selecting a knowledge interaction framework for the quantity of knowledge branches.

Example 26 includes the method as defined in example 25, further including applying at least one of a top-down knowledge interaction framework, a bottom-up knowledge interaction framework, or a bi-directional knowledge interaction framework.

Example 27 includes the method as defined in example 25, further including defining an optimization goal, the optimization goal to include the selected knowledge interaction framework.

Example 28 includes a system to train a neural network, the system comprising means for determining an architecture type of a neural network, means for selecting a quantity of knowledge branches based on the architecture type, and means for improving a training metric by appending the quantity of knowledge branches to respective layers of the neural network.

Example 29 includes the system as defined in example 28, further including means for calculating the quantity of knowledge branches based on a quantity of layers associated with the neural network.

Example 30 includes the system as defined in example 29, further including means for dividing the quantity of layers associated with the neural network by a branch factor to calculate the quantity of knowledge branches.

Example 31 includes the system as defined in example 28, further including means for identifying candidate insertion locations of the neural network.

Example 32 includes the system as defined in example 31, further including means for calculating a middle layer associated with the neural network.

Example 33 includes the system as defined in example 31, further including means for inserting one of the quantity of knowledge branches at one of the candidate insertion locations.

Example 34 includes the system as defined in example 28, further including means for selecting a knowledge interaction framework for the quantity of knowledge branches.

Example 35 includes the system as defined in example 34, further including means for applying at least one of a top-down knowledge interaction framework, a bottom-up knowledge interaction framework, or a bi-directional knowledge interaction framework.

Example 36 includes the system as defined in example 34, further including means for defining an optimization goal, the optimization goal to include the selected knowledge interaction framework.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to train a neural network, the apparatus comprising:

interface circuitry;

machine-readable instructions; and at least one processor circuit to be programmed by the machine-readable instructions to:

determine an architecture type of a neural network, the neural network including intermediate layers between a first layer and a last layer;

select a quantity of network classifiers based on the architecture type; and improve a training metric of the neural network by:

determining a middle one of the intermediate layers; and attaching a first one of the network classifiers to the middle one of the intermediate layers of the neural network; and remove the first one of the network classifiers from a backbone of the neural network prior to deployment of the neural network wherein a knowledge interaction between the first one of the network classifiers and a second one of the network classifiers includes a knowledge interaction matrix generated based on a binary indicator function, the binary indicator function representative of a set of layer indices of the neural network identifying one or more activation locations of the knowledge interaction.

2. The apparatus as defined in claim 1, wherein one or more of the at least one processor circuit is to calculate the quantity of network classifiers based on a quantity of layers associated with the neural network.

3. The apparatus as defined in claim 2, wherein one or more of the at least one processor circuit is to calculate the quantity of network classifiers based on dividing the quantity of layers associated with the neural network by a branch factor.

4. The apparatus of claim 2, wherein a current class probability output from the first one of the network classifiers represents a soft label used to align a probabilistic prediction output from a second one of the network classifiers with the current class probability output.

5. The apparatus as defined in claim 1, wherein one or more of the at least one processor circuit is to identify candidate insertion locations of the neural network.

6. The apparatus as defined in claim 5, wherein one or more of the at least one processor circuit is to insert one of the quantity of network classifiers at one of the candidate insertion locations.

7. The apparatus as defined in claim 1, wherein one or more of the at least one processor circuit is to attach a second one of the network classifiers to a second layer adjacent to the middle one of the intermediate layers.

8. The apparatus of claim 1, wherein a soft cross-entropy loss function defines a knowledge interaction between the first one of the network classifiers and a second one of the network classifiers.

9. At least one non-transitory computer readable medium comprising instructions to cause at least one processor circuit to:

determine an architecture type of a neural network, the neural network including intermediate layers between a first layer and a last layer;

select a quantity of network classifiers based on the architecture type; and improve a training metric of the neural network by:

determining a middle one of the intermediate layers; and attaching a first one of the network classifiers to the middle one of the intermediate layers of the neural network; and remove the first one of the network classifiers from a backbone of the neural network prior to deployment of the neural network wherein a knowledge interaction between the first one of the network classifiers and a second one of the network classifiers includes a knowledge interaction matrix generated based on a binary indicator function, the binary indicator function representative of a set of layer indices of the neural network identifying one or more activation locations of the knowledge interaction.

10. The at least one non-transitory computer readable medium as defined in claim 9, wherein the computer readable instructions are to cause one or more of the at least one processor circuit to calculate the quantity of network classifiers based on a quantity of layers associated with the neural network.

11. The at least one non-transitory computer readable medium as defined in claim 10, wherein the computer readable instructions are to cause one or more of the at least one processor circuit to calculate the quantity of network classifiers based on dividing the quantity of layers associated with the neural network by a branch factor.

12. The at least one non-transitory computer readable medium as defined in claim 9, wherein the computer readable instructions are to cause one or more of the at least one processor circuit to identify candidate insertion locations of the neural network.

13. The at least one non-transitory computer readable medium as defined in claim 12, wherein the computer readable instructions are to cause the one or more of the at least one processor circuit to insert one of the quantity of network classifiers at one of the candidate insertion locations.

14. The at least one non-transitory computer readable medium as defined in claim 9, wherein the computer readable instructions are to cause one or more of the at least one processor circuit to attach a second one of the network classifiers to a second layer adjacent to the middle one of the intermediate layers.

15. The at least one non-transitory computer readable medium as defined in claim 9, wherein the computer readable instructions are to cause the one or more of the at least one processor circuit to select a knowledge interaction framework for the quantity of network classifiers.

16. The at least one non-transitory computer readable medium as defined in claim 15, wherein the computer readable instructions are to cause the one or more of the at least one processor circuit to implement the knowledge interaction framework as at least one of a top-down knowledge interaction framework, a bottom-up knowledge interaction framework, or a bi-directional knowledge interaction framework.

17. The at least one non-transitory computer readable medium as defined in claim 15, wherein the computer readable instructions are to cause the one or more of the at least one processor circuit to define an optimization goal, the optimization goal to include the selected knowledge interaction framework.

18. A computer implemented method to train a neural network, the method comprising:

determining, by executing an instruction with at least one processor, an architecture type of a neural network, the neural network including intermediate layers between a first layer and a last layer;

selecting, by executing an instruction with one or more of the at least one processor, a quantity of network classifiers based on the architecture type; and improving, by executing an instruction with one or more of the at least one processor, a training metric of the neural network by:

determining a middle one of the intermediate layers; and attaching a first one of the network classifiers to the middle one of the intermediate layers of the neural network; and removing, by executing an instruction with one or more of the at least one processor, the first one of the network classifiers from a backbone of the neural network prior to deployment of the neural network, wherein a knowledge interaction between the first one of the network classifiers and a second one of the network classifiers includes a knowledge interaction matrix generated based on a binary indicator function, the binary indicator function representative of a set of layer indices of the neural network identifying one or more activation locations of the knowledge interaction.

19. The method as defined in claim 18, further including selecting a knowledge interaction framework for the quantity of network classifiers.

20. The method as defined in claim 19, further including applying at least one of a top-down knowledge interaction framework, a bottom-up knowledge interaction framework, or a bi-directional knowledge interaction framework.

21. The method as defined in claim 19, further including defining an optimization goal, the optimization goal to include the selected knowledge interaction framework.

22. A system to train a neural network, the system comprising:

means for determining an architecture type of a neural network, the neural network including intermediate layers between a first layer and a last layer;

means for selecting a quantity of network classifiers based on the architecture type; and means for improving a training metric of the neural network by:

determining a middle one of the intermediate layers; and attaching a first one of the network classifiers to the middle one of the intermediate layers of the neural network; and means for implementing a knowledge branch to remove the first one of the network classifiers from a backbone of the neural network prior to deployment of the neural network wherein a knowledge interaction between the first one of the network classifiers and a second one of the network classifiers includes a knowledge interaction matrix generated based on a binary indicator function, the binary indicator function representative of a set of layer indices of the neural network identifying one or more activation locations of the knowledge interaction.

23. The system as defined in claim 22, further including means for calculating the quantity of network classifiers based on a quantity of layers associated with the neural network.

24. The system as defined in claim 23, wherein the means for calculating the quantity of network classifiers is based on dividing the quantity of layers associated with the neural network by a branch factor.

* * * * *